Figure 2:
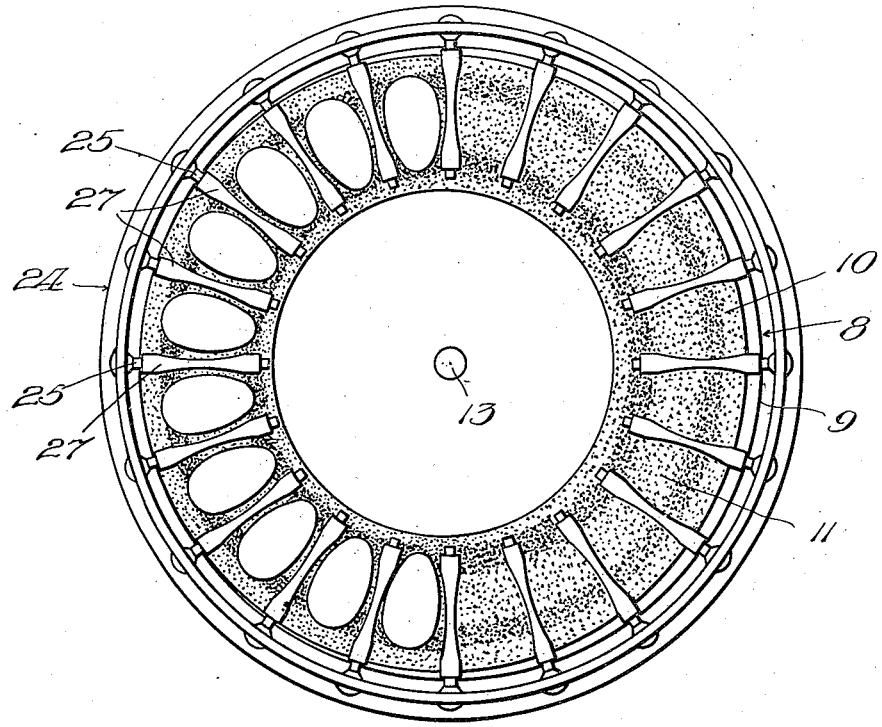

Oct. 1, 1929.                    W. McDONALD                    1,730,157
                              EGG CLEANING MACHINE
                         Filed July 7, 1927           2 Sheets-Sheet 1
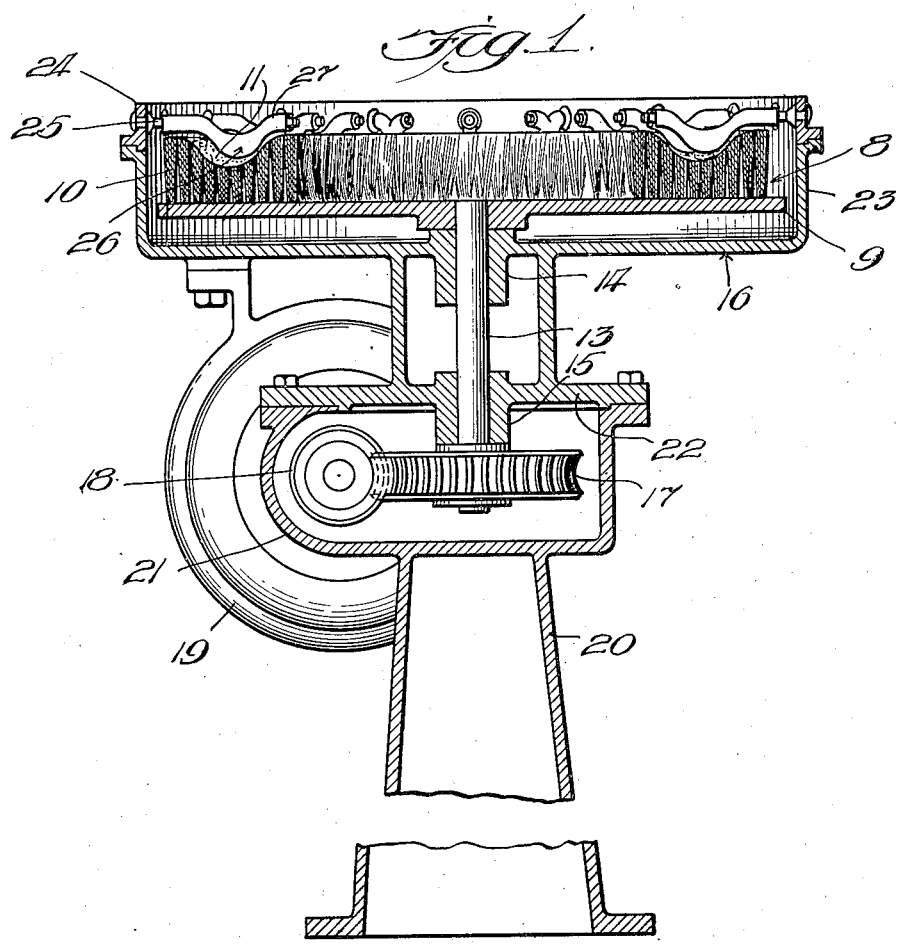
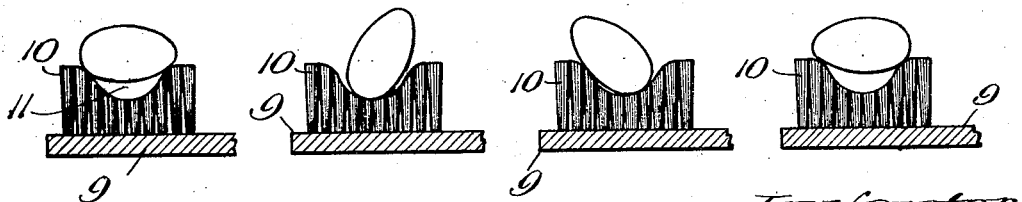
Inventor:
William McDonald.
Attys Oct. 1, 1929.  W. McDONALD  1,730,157
EGG CLEANING MACHINE
Filed July 7, 1927   2 Sheets-Sheet 2

Inventor:
William McDonald.

Patented Oct. 1, 1929

1,730,157

UNITED STATES PATENT OFFICE

WILLIAM McDONALD, OF RIVER FOREST, ILLINOIS, ASSIGNOR TO SWIFT & COMPANY, OF CHICAGO, ILLINOIS, A CORPORATION OF ILLINOIS

EGG-CLEANING MACHINE

Application filed July 7, 1927. Serial No. 203,917.

My invention has for its object to provide a machine for completely and expeditiously removing dirt and other matter adhering to the shells of eggs or other similar articles so that they will present a more attractive appearance. Prior to my invention, machines of greater or less efficiency for the purpose have been placed upon the market for cleaning eggs but they are complicated, expensive and liable to get out of order. The machine of my invention is extremely simple in construction and operation, inexpensive to manufacture and efficient. In the preferred form it is particularly adapted for cleaning eggs and will be described in relation thereto. Generaly stated it comprises a brush, the operative surface of which is approximately horizontal and uppermost so that the eggs to be cleaned may be laid thereon, means being provided for moving the brush relative to the eggs being cleaned so that the latter are thoroughly brushed. In the preferred construction the eggs are slowly revolved and also turned over end for end by the movement of the brush so as to bring all parts of the surfaces of the articles into contact with the brush. Other features and advantages of the invention will appear from the following detailed description and claims. It is to be understood, however, that the specific disclosure is for the purpose of exemplification and that the scope of the invention is to be gathered from the claims in which I have endeavored to distinguish it from the prior art so far as known to me, without, however, relinquishing or abandoning any portion or feature thereof.

Figure 3:
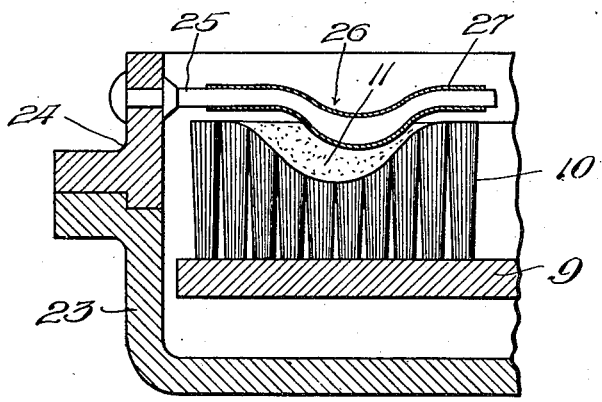

In the drawings accompanying and forming a part of the specification, Figure 1 is a vertical axial section through my improved cleaning machine, parts being shown in elevation;

Fig. 2 is a plan view thereof;

Fig. 3 a vertical section of a portion of the machine on an enlarged scale, and

Figs. 4, 5, 6, and 7 fragmentary views in section illustrating the operation of the device.

The brush 8, in the specific form of the invention disclosed in the illustration, comprises a disk 9, which is mounted for rotation on a vertical axis, and bristes 10 projecting from the upper surface thereof. The bristles 10 occupy an annular area adjacent the edge of the disk, though if desired they might properly occupy the entire surface of the disk, and may be of any suitable material having the desired elasticity. An annular trough 11 is formed in the bristles by properly cutting them away, the cross sectional form of the trough being preferably as shown so as to provide for efficiently brushing the ends as well as the intermediate portions of the eggs. The specific manner of mounting the brush for rotation is not essential. In the machine shown the disk 9 is carried by a shaft 13 mounted in vertical bearings 14—15 in a casting 16. The lower end of the shaft 13 carries a worm wheel 17 meshing with a worm 18 which may be driven by an electric or other motor. The casing of the motor is shown at 19.

The casting 16 is supported on a standard 20, the upper end of which is integral with a casing 21, which contains the worm wheel and worm. The upper end of the casing is closed by a flange 22 formed on the upper casting 16.

The casting 16 comprises a bowl 23 which surrounds the rotating brush, and the upper edge of the bowl receives an annulus 24 which constitutes an extension of the cylindrical wall of the bowl. The annulus is provided with an annular series of radial inwardly-projecting fingers 25 which extend over the annular brush and are spaced apart a distance sufficient to permit the eggs or other articles to be cleaned to be deposited between said fingers. Preferably the fingers are downwardly bent over the annular channels in the brush as at 26 and are covered by sleeves 27 of rubber or similar such cushioning material. Preferably the fingers are formed of round bars somewhat flattened at their intermediate portions as shown.

In using the machine for cleaning eggs, the eggs, which have preferably been immersed in water or a suitable solution for loosening up the dirt thereon, are deposited in the annular trough in the brush between the fingers of the annular series. The machine is revolved at a suitable speed, which may be 100 revolutions per minute. The eggs are prevented from being carried around with the brush by the fingers, which also retard the revolution of the eggs so that bristles move in frictional contact with the latter and clean them. The eggs, however, revolve slowly so that the surface in contact with the bristles is constantly changing, as it is cleaned. Not only do the eggs revolve about their longitudinal axes as the brush revolves, but they also turn over end for end. The reason for this action is that they tend to ride up the outer wall of the trough and the inclination of the wall is such as to prevent or limit the outward movement and to cause the eggs to topple over back into the trough and so be reversed end for end. In this motion of the eggs the end portions thereof are thoroughly brushed so that the eggs when removed from the machine are cleaned at all portions of their surfaces. This end for end movement of the egg is well shown in Figs. 4 to 7 inclusive, in which it will be observed that the curvature of the trough, transversely, is such as to efficiently clean the ends of the eggs, as well as the intermediate portions. I have found that the turning of the eggs end for end is somewhat assisted or accelerated if the bristles are more or less irregular. Furthermore, the end for end rotation of the eggs may be increased or accelerated by forming the channel in the brush slightly eccentric to the axis of rotation of the machine. But such eccentricity is preferably slight and I have found in practice that it should not exceed half an inch. Manifestly, instead of making the trough eccentric, the brush itself and as a whole may be mounted on the shaft 13 in a position slightly eccentric to the latter and it is so shown in Fig. 1 of the drawing.

In using the machine the eggs are dropped in the spaces between the fingers with their longitudinal axes substantially radial to the machine. The machine is then rotated at the proper speed until the eggs have been properly cleaned and then they may be removed.

I claim:

1. In a cleaning device of the class described, a brush having a continuous channel in its upper face to receive articles to be cleaned, means to revolve the brush on a substantial vertical axis and means above the brush for holding articles thereon against rotation therewith.

2. In a cleaning device of the class described, a substantially horizontal disk, means for rotating the disk on a vertical axis, an annularly continuous bed of friction material on the upper surface of the disk adapted to loosely support articles to be cleaned, and means above the disk for preventing articles on the disk from being carried around therewith.

3. In a cleaning device of the class described, a substantially horizontal disk, means for rotating the disk on a vertical axis, friction material on the upper surface of the disk having an annular channel formed therein and means above the disk for preventing articles thereon from being carried around therewith.

4. In a machine of the class described, a support, a vertical shaft journaled therein, means for rotating said shaft, a disk carried by said shaft, friction means on the upper surface of said disk having an annular channel formed therein, the channel being slightly eccentric to the shaft and means above the channel for preventing articles therein being carried around by the rotation of the disk.

5. In a machine of the class described, a basin, a support therefor, a vertical shaft journaled in said support, a horizontal disk mounted on the upper end of the shaft and within the basin, an annular brush on the upper surface of the disk, said brush being formed with an annular channel curved in cross-section and with sloping walls, and fingers projecting inwardly from the rim of said basin over the annular brush.

6. In a machine of the class described, a stand, a vertical shaft journaled therein, means for rotating the shaft, a disk carried by the shaft on the upper end of the latter, an annular brush on the upper surface of said disk, said brush having an annular channel, substantially radial fingers extending over the channel in the brush and cushioning sleeves on said fingers.

In testimony whereof, I have subscribed my name.

WILLIAM McDONALD.